(12) United States Patent
Schindzielorz et al.

(10) Patent No.: US 6,905,985 B1
(45) Date of Patent: Jun. 14, 2005

(54) FABRIC FILM FOR AUTOMOTIVE HEATERS

(75) Inventors: Michael H. Schindzielorz, Kernersville, NC (US); Stephen P. Lengyel, Oak Ridge, NC (US)

(73) Assignee: Highland Industries, Inc., Greensboro, NC (US)

( * ) Notice: Subject to any disclaimer, the term of this patent is extended or adjusted under 35 U.S.C. 154(b) by 247 days.

(21) Appl. No.: 10/301,509

(22) Filed: Nov. 21, 2002

(51) Int. Cl.$^7$ .............................................. B32B 27/12
(52) U.S. Cl. ...................... 442/65; 442/109; 442/148; 442/164; 442/218; 442/220; 454/156
(58) Field of Search .................. 442/65, 109, 148, 442/164, 218, 220, 286; 454/156, 121

(56) References Cited

U.S. PATENT DOCUMENTS

| | | | | |
|---|---|---|---|---|
| 3,723,139 A | * | 3/1973 | Larkin | 524/410 |
| 4,010,146 A | * | 3/1977 | Russell et al. | 428/376 |
| 4,298,643 A | * | 11/1981 | Miyagawa et al. | 428/85 |
| 4,380,311 A | * | 4/1983 | Torii | 242/615.4 |
| 4,488,619 A | * | 12/1984 | O'Neill | 181/290 |
| 4,659,612 A | * | 4/1987 | Balloni et al. | 428/213 |
| 4,732,789 A | * | 3/1988 | Hauser et al. | 427/393.3 |
| 4,769,418 A | | 9/1988 | Mizuno et al. | 525/106 |
| 4,886,481 A | * | 12/1989 | Gutfleisch et al. | 464/162 |
| 5,224,803 A | * | 7/1993 | Lallier | 409/131 |
| 5,488,092 A | * | 1/1996 | Kausch et al. | 528/60 |
| 5,653,630 A | * | 8/1997 | Higashihara | 454/121 |
| 5,658,662 A | * | 8/1997 | Leumer | 428/364 |
| 5,834,381 A | | 11/1998 | Roe et al. | 442/41 |
| 6,088,552 A | * | 7/2000 | Morinaga et al. | 399/106 |
| 6,323,159 B1 | * | 11/2001 | Raza | 508/100 |
| 6,383,959 B1 | * | 5/2002 | Morris et al. | 442/218 |
| 6,733,705 B1 | * | 5/2004 | Obara | 264/45.3 |
| 2002/0037401 A1 | | 3/2002 | Buch-Rasmussen et al. | 428/336 |
| 2002/0064646 A1 | | 5/2002 | Cretekos et al. | 428/331 |

OTHER PUBLICATIONS

Publication "The Icon Analyst", The University of Arizona, Apr. 2000, No. 59, to Ralph Griswold et al..*
DuPont FTFE FPD 3584 Fluoropolymer resin (Dec. 1996).
DuPont Feflon PTFE 304A Fluoropolymer resin (Jun. 1999).
DuPont Feflon PTFE 30B Fluoropolymer resin (Jun. 1999).
DuPont Teflon PTFE 30 Fluoropolymer resin (Jun. 1999).
DuPont Teflon PTFE B Fluoropolymer resin (Jun. 1999).
DuPont Teflon PTFE 35 Fluoropolymer resin (Jun. 1999).
DuPont Teflon PTFE K–20 Fluoropolymer resin (Jun. 1999).
DuPont Teflon PTFE 313A (Jun. 1999).
DuPont Teflon PTFE 307A (Jun. 1999).
DuPont Teflon PTFE 305A Fluoropolymer resin (Jun. 1999).
Product Information from Dow Corning Lubolid Friction Control (Aug. 2002).
Fluorinated Polymers for Lubricants from Shamrock Technologies, Inc. (May 2001).
Nonoflon X–Treme from Shamrock Technologies, Inc. Undated.
Fluon PTFE Resins–Aqueous Dispersions–information from the internet; undated.

(Continued)

*Primary Examiner*—Terrel Morris
*Assistant Examiner*—Andrew T Piziali
(74) *Attorney, Agent, or Firm*—MacCord Mason PLLC (57) ABSTRACT

A fabric cartridge for an automotive beating and cooling system. The apparatus includes: a cartridge assembly, the cartridge assembly including a housing; and a single-ply, die cut fabric web disposed therein. In the preferred embodiment, the fabric web includes: a float-free fabric substrate; at least one surface including a laminated film; and a plurality of apertures for diverting airflow in the heating and cooling system; and a noise/friction reduction agent for reducing the interaction between the housing and the fabric web.

92 Claims, 6 Drawing Sheets

OTHER PUBLICATIONS

Rhodia Phosphorus & Performance Derivatives–Antiblaze N; information from the internet; undated.

Ampacet Antiblock–"The Basics" Undated.

Deerfiled Urethane Aromataic Polyether Type Thermoplastic Polyurethane Film and Sheet Product Series; undated.

Deerfiled Urethane Flame Retardant Aromatic Type Thermoplastic Polyurethane Film and Sheet Products; undated.

Deerfield Urethane Optical Aliphatic thermosplastic Polyurethane Film/Sheet Products for Glass Interlayer; undated.

Deerfield Dureflex Thermoplastic Polyurethane Film Y& Sheet "At A Glance" Product Market/Applications Data; undated.

Deerfield Urethane Dureflex Elastomeric Film and Sheet-Product Data; undated.

Business Communications Company; C–004Z Flame–Retardant Chemicals; Oct. 1998.

* cited by examiner

FABRIC FILM FOR AUTOMOTIVE HEATERS

BACKGROUND OF THE INVENTION (1) Field of the Invention

The present invention relates generally to fabric cartridges for automotive heating and cooling systems and, more particularly, to fabric webs for use in such cartridges.

(2) Description of the Prior Art

Automotive heating and cooling systems typically use movable "doors" which are opened and closed to change the exit points of the airflow from the system. One or more variable speed fans are used to control the airflow rate and movable vents may also be used to change the direction or air volume at one or more of the exit points.

Such systems are simple and reliable. However, they are bulky and reduce the available space in the dashboard for other uses. Also, opening and closing "doors" are inherently noisy.

In the last several years, several luxury cars have switched to heating and cooling systems using a movable web having a plurality of openings at different locations and of different sizes to control the direction and, to some degree, the air flow rates. These systems are also simple and reliable and, in addition, are much more compact. However, while not having the same noise "signature" as door-type heating and cooling systems, they may have their own characteristic noise "signature" due to the movement of the sliding web within the system.

Various approaches have been tried to address this problem including multiple-ply fabric webs and specially designed fabric constructions. However, such approaches add significantly to the cost of the fabric web.

Thus, there remains a need for a new and improved fabric cartridge for an automotive heating and cooling system which is quiet while, at the same time, utilizes a simple and economical fabric construction.

SUMMARY OF THE INVENTION

The present invention is directed to a fabric cartridge for an automotive heating and cooling system. The apparatus includes: a cartridge assembly, the cartridge assembly including a housing; and a single-ply, die cut fabric web disposed therein.

In the preferred embodiment, the fabric web includes: a float-free fabric substrate; at least one surface including a laminated film; and a plurality of apertures for diverting airflow in the heating and cooling system; and a noise/friction reduction agent for reducing the interaction between the housing and the fabric web and/or between layers of the fabric web.

A filler may be integrally formed within the cartridge assembly housing. Such a filler reduces a polymer content of the cartridge assembly housing. Applicants believe that appropriate fillers should be of such a size and distribution so as not to interfere with the quiet operation of the fabric cartridge. In addition, appropriate fillers reduce costs and strengthen the cartridge assembly housing. Some examples of the filler that may be appropriate include any one of natural silica (diatomaceous earth), silicon dioxide ($SiO_2$)-mined, talc, magnesium silicate- mined, synthetic silica, silicon dioxide-manufactured, calcium carbonate, calcium carbonate ($CaCO_3$)-mined, ceramic spheres, alumina-silicate ceramic-manufactured, kaolin clay, aluminum silicate-mined, mica, aluminum potassium silicate-mined, calcium phosphate and combinations thereof. Applicants have found that talc performs well as the filler. The filler may be between about 1 and 40 wt. % of the cartridge assembly housing.

Also, the noise/friction reduction agent may be integrally formed within the cartridge assembly housing. The reduction agent may be any one of a antiblock additive, slip additive, and antiblock additive and slip additive. Such antiblock and slip additives are used in the polymer film art. The reduction agent may be selected from the group consisting of higher aliphatic acid amides, higher aliphatic acid esters, waxes, metal soaps, silicones, fluoropolymers, and fatty acids. Applicants believe that a preferred reduction agent is a silicone oil. Useful silicone oils are sold by Dow Coming Corporation of Midland, Mich. The noise/friction reduction agent may be between about 1 and 5 wt. % of the cartridge assembly housing.

The fabric web also may include a low friction finish, for example, as a topicality. Examples of the low friction finish may include any one of higher aliphatic acid amides, higher aliphatic acid esters, waxes, metal soaps, silicones, fluoropolymers, higher aliphatic acid esters and combination thereof. Preferably, the low friction finish may be selected from the group consisting of silicones, fluoropolymers, and higher aliphatic acid esters. One particularly preferred low friction finish is a fluoropolymer, such as, for example, polytetrafluoroethylene (PTFE), while another is a silicone oil, such as, for example, a polydimethylsiloxane. Applicants are aware that PTFE materials milled to very fine size (from between about 0.25 and 0.28 $\mu$m) retain the excellent lubricating properties of PTFE when included in a base material. Milled PTFE materials are commercially available as powders that may then be compounded in a polymer. Also, milled PTFE materials are commercially available as powder dispersed in liquids.

In the preferred embodiment, the cartridge assembly includes a supply roll and a take-up roll. The cartridge assembly may further include at least one guide roller and a female hex sprocket for engaging a drive motor. Also, in the preferred embodiment, at least one of the supply roll and take-up roll is tensioned. In the most preferred embodiment, the supply roll and the take-up roll are counter-tensioned with respect to one another.

The fabric substrate is a plain weave, preferably formed from polyester yarn. The plain weave may have about 76× about 56 threads per inch. In the preferred embodiment, the polyester yarn has a tenacity of greater than about 4 grams/denier. The warp yarn of the fabric substrate is between about 70 and 250 denier, preferably about 150 denier, and the fill yarn of the fabric substrate is also between about 70 and 250 denier, preferably about 150 denier. In the preferred embodiment, the yarn includes greater than about 34 filaments per strand of yarn and, preferably, about 48 filaments per strand of yarn.

According to the present invention, the thickness of the laminated film is between about 0.5 and 2 mils (a mil in this context is a thousandth of an inch) with about 1 mil being preferred. The laminated film is a polyurethane film, preferably, a thermoplastic polyurethane film, more preferably, a polyether thermoplastic polyurethane film, and, even more preferably an aromatic polyether thermoplastic polyurethane film.

The laminated film may further include an antiblock agent, which may be provided as a filler. In such a case, the filler may be between about 0.1 and 5 wt. % of the laminated film. Applicants believe that examples of the antiblock agent in the form of a filler may include any one of natural silica (diatomaceous earth), silicon dioxide ($SiO_2$)-mined, talc, magnesium silicate-mined, synthetic silica, silicon dioxide-manufactured, calcium carbonate, calcium carbonate ($CaCO_3$)-mined, ceramic spheres, alumina-silicate ceramic-manufactured, kaolin clay, aluminum silicate-mined, mica, aluminum potassium silicate-mined, calcium phosphate, and combinations thereof. Preferred antiblock agent in the form of a filler is an inorganic filler that includes any one of natural silica (diatomaceous earth), talc, and combination thereof. The most preferred antiblock agent in the form of a filler is natural silica (diatomaceous earth).

Also, the laminated film may further include a film slip additive. The film slip additive may be provide as any one of a filler, a topicality, and combinations thereof The film slip additive filler may be provided at between about 0.1 and 5 wt. % of the laminated film. The film slip additive topicality may be provided at between about 1 and 3 wt. % of the laminated film.

The film slip additive may include any one of higher aliphatic acid amides, higher aliphatic acid esters, waxes, metal soaps, silicones, fluoropolymers, fatty acids and combinations thereof. Examples of other film slip additive include any one of bis-amide ethylene, bisstearamide (ebs), secondary amide, stearyl erucamide, primary amide, stearamide, erucamide, organic stearate, glycerol monostearate (GMS), metallic stearate, zinc stearate and combinations thereof. Preferred film slip additives are selected from the group consisting of silicones, fluoropolymers, and fatty acids and a more preferred film slip additive is a silicone oil, such as for example polydimethylsiloxane.

The fabric may further include an interface coating between the fabric substrate and the laminated film. Preferably, the interface coating is a polyurethane solution coating. The interface coating may further include an adhesion promoter, such as a mixture of isocyaninate and azaridine. The interface coating may further include a flame retardant, such as a chemistry based on any one of alumina trihydrate, antimony oxide, bromine, chlorine, magnesium hydroxide, and phosphorus. In automotive application a phosphorus-based chemistry such as cyclic phosphates, phosphites, and phosphate esters may be preferred.

Finally, in the preferred embodiment, the opposite surface of the fabric includes a second laminated film, wherein the second laminated film is substantially similar to the first laminated film.

Accordingly, one aspect of the present invention is to provide a fabric cartridge for an automotive heating and cooling system. The apparatus includes: a cartridge assembly including a housing; and a single-ply, die cut fabric web disposed therein.

Another aspect of the present invention is to provide a fabric web for a fabric cartridge for an automotive heating and cooling system. The fabric web includes: a float-free fabric substrate; at least one surface including a laminated film; and a plurality of apertures for diverting airflow in the heating and cooling system.

Still another aspect of the present invention is to provide a fabric cartridge for an automotive heating and cooling system. The apparatus includes: a cartridge assembly, the cartridge assembly including a housing; a single-ply, die cut fabric web disposed therein, the fabric web including: (i) a float-free fabric substrate; (ii) at least one surface including a laminated film; and (iii) a plurality of apertures for diverting airflow in the heating and cooling system; and a noise/friction reduction agent for reducing the interaction between the housing and the fabric web and/or between layers of the fabric web.

These and other aspects of the present invention will become apparent to those skilled in the art after a reading of the following description of the preferred embodiment when considered with the drawings.

DESCRIPTION OF THE PREFERRED EMBODIMENTS

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Figure 1:
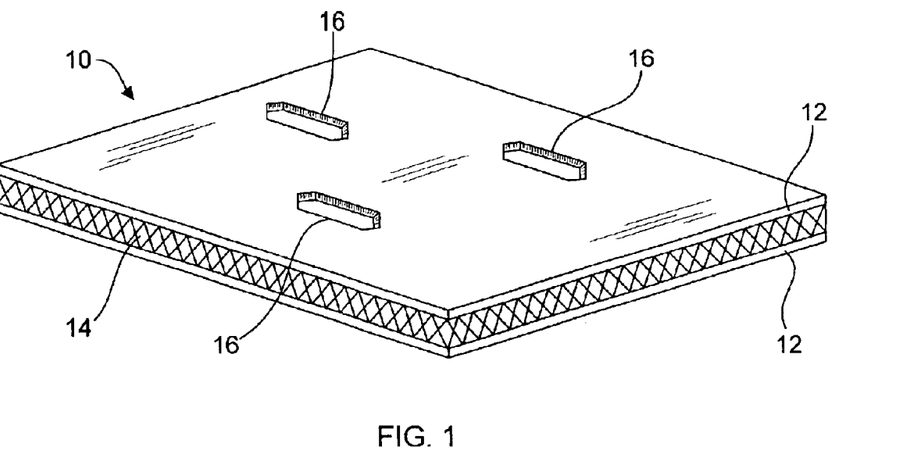
FIG. 1 is a perspective cross-sectional view of a single-ply, laminated die cut fabric web for a fabric cartridge for an automotive heating and cooling system constructed according to the present invention.
Figure 2:
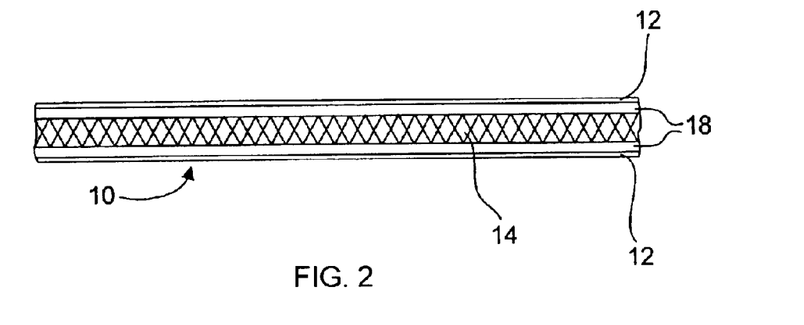
FIG. 2 is a cross sectional view of the laminated fabric shown in FIG. 1.

Referring now to the drawings in general and FIG. 1 in particular, it will be understood that the illustrations are for the purpose of describing a preferred embodiment of the invention and are not intended to limit the invention thereto. As best seen in FIG. 1, according to the present invention, a laminated fabric for automotive heating and cooling systems is provided, and is generally denoted by the numeral 10. Referring to FIGS. 1 and 2, fabric 10 is a laminate formed of a top or first layer of a polyurethane film 12 comprised of a polyether polyurethane compound, a second (middle) layer of reinforcing fabric substrate 14, and a bottom or third layer of the polyurethane film 12 having the same composition and thickness as the first film layer. Films 12 may vary in thickness; however, the films should be between about 0.2 and 2 mils (a mils in this context is a thousandth of an inch) thick, with 1 mil being preferred. A plurality of apertures 16 for diverting airflow in the heating and cooling system are die cut through the surface of the laminated fabric after the laminate is formed.

The fabric substrate 14 is juxtapositioned between the two polyurethane film layers 12. The polyurethane films 12 and fabric 14 are thermally bonded together at sufficient temperatures to form a fire retardant, non-toxic laminated fabric 10 that is between about 3 and 8 mils thick, preferably about 5 mils thick. An interface coating 18, in the form of a polyurethane solution coating, may be added to fabric substrate 14. The interface coating 18 may further include an adhesion promoter, such as a mixture of isocyaninate and azaridine. The interface coating 18 may further include a flame retardant, such as a chemistry based on any one of alumina trihydrate, antimony oxide, bromine, chlorine, magnesium hydroxide, and phosphorus. In automotive application a phosphorus-based chemistry may be preferred. Applicants have found that the commercially available phosphorus-based flame retardant Antiblaze N (cyclic phosphate esters) from Albright & Wilson Americas and a material sold under the name AC-3WM by Broadview Technologies, Inc of Newark, N.J. to work satisfactorily. Applicants believe that other suitable flame retardants may include phosphorus-based plasticizers such as cyclic phosphates, phosphites, and phosphate esters, exemplified by Pliabrac TCP (tricresyl phosphate), Pliabrac TXP (trixylenyl phosphate), Antiblaze TXP (tar acid, cresol, xylyl, phenol phosphates), and Antiblaze 524 (trixylyl phosphate) from Albright & Wilson Americas; Firemaster BZ 54 (halogenated aryl esters) from Great Lakes Chemicals; chlorinated biphenyl, 2-ethylhexyl diphenyl phosphate, isodecyl diphenyl phosphate, triphenyl phosphate, cresyl diphenyl phosphate, p-t-butylphenyl diphenyl phosphate, triphenyl phosphite, and the like. Other examples of phosphorus-based plasticizers include chlorinated alkyl phosphate esters such as Antiblaze 100 (chloro alkyl diphosphate ester) from Albright & Wilson Americas; alkyl phosphates and phosphites such as tributyl phosphate, tri-2-ethylhexyl phosphate, and triisoctyl phosphite; other organophosphates and organophosphites such as tributoxy ethyiphosphate; other phosphates and phosphonates such as chlorinated diphosphate and chlorinated polyphosphonate; and the like. Mixtures can also be used.

The polyurethane films 12 that were used in the present invention are manufactured by Deerfield Urethane, Inc., A Bayer Company, (Deerfield, Mass.) and identified as Product "PT6211S". The films 12 are compounded from a polyurethane; in particular, a thermoplastic polyurethane; more particularly an polyether thermoplastic polyurethane, and, even more particularly an aromatic polyether thermoplastic polyurethane.

The polyurethane films 12 may further include an antiblock agent, which may be provided as a filler. In such a case, the filler may be between about 0.1 and 5 wt. % of the laminated film. Applicants believe that examples of the antiblock agent in the form of a filler may include any one of natural silica (diatomaceous earth), silicon dioxide ($SiO_2$)-mined, talc, magnesium silicate-mined, synthetic silica, silicon dioxide-manufactured, calcium carbonate, calcium carbonate ($CaCO_3$)-mined, ceramic spheres, alumina-silicate ceramic-manufactured, kaolin clay, aluminum silicate-mined, mica, aluminum potassium silicate-mined, calcium phosphate, and combinations thereof. Preferred antiblock agent in the form of a filler is an inorganic filler that includes any one of natural silica (diatomaceous earth), talc, and combination thereof.

The most preferred antiblock agent in the form of a filler is natural silica (diatomaceous earth). Diatomaceous earth is also known as: amorphous silica, celite, celite (high purity analytical grade), celite 545 filter aid, chromosorb W-AW-DMCS, chromosorb W-HP, diatomaceous earth (uncalcined), diatomaceous silica, diatomite, filter agent, infusorial earth, kieselgur, silica (amorphous), silica (amorphous-precipitated) siliceous earth, and tripolite. Diatomaceous earth is a natural (not calcined or flux calcined) compound with many elements. Major ingredients of diatomaceous earth may be represented as compounds of which silicon dioxide ($SiO_2$) is a major component and aluminum oxide ($Al_2O_3$), iron oxide ($Fe_2O_3$), calcium oxide (CaO), magnesium oxide (MgO) and other oxides are minor components.

As discussed in U.S. Pat. application Ser. No. 20020064646, published May 30, 2002 and filed in the names of George Cretekos and Robert A MigliorinI on May 27, 1999, useful antiblock additives such as silicon dioxide are sold by W. R. Grace under the trademark SYLOBLOC 44 and Degussa under the trademark Sipernat; polymethylsilsesquioxane sold by Toshiba Silicone Co., Ltd. under the trademark TOSPEARL and is described in U.S. Pat. No. 4,769,418; a spherical particle made from methyl methacrylate resin sold by Nippon Shokubai under the trademark EPOSTAR. The disclosures of U.S. patent application Ser. No. 20020064646 and U.S. Pat. No. 4,769,418 are hereby herein incorporated by reference in their entirety.

Also, the laminated film may further include a film slip additive. The film slip additive may be provided as any one of a filler, a topicality, and combinations thereof. The film slip additive filler may be provided at between about 0.1 and 5 wt. % of the laminated film. The film slip additive topicality may be provided at between about 1 and 3 wt. % of the laminated film.

The film slip additive may include any one of higher aliphatic acid amides, higher aliphatic acid esters, waxes, metal soaps, silicones, fluoropolymers, fatty acids and combinations thereof. Examples of other film slip additive include any one of bis-amide ethylene, bisstearamide (ebs), secondary amide, stearyl erucamide, primary amide, stearamide, erucamide, organic stearate, glycerol monostearate (GMS), metallic stearate, zinc stearate and combinations thereof. Preferred film slip additives are selected from the group consisting of silicones, fluoropolymers, and fatty acids and a more preferred film slip additive is a silicone oil, such as for example polydimethylsiloxane.

As discussed in U.S. pat. application Ser. No. 20020064646, published May 30, 2002 and filed in the names of George Cretekos and Robert A Migliorini on May 27, 1999, and U.S. pat. application Ser. No. 20020037401, published Mar. 28, 2002 and filed in the names of Thomas Buch-Rasmussen, et al. on Mar. 2, 1999, useful film slip additives such as silicone oils are sold by Dow Corning Corporation of Midland, Mich. The disclosures of U.S. patent application Ser. No. 20020064646 and U.S. pat. application Ser. No. 20020037401 are hereby herein incorporated by reference in their entirety.

Fabric substrate 14 is preferably produced on a conventional water jet loom. In the preferred fabric substrate, the warp yarns are made of polyester having a denier of about 150 to meet the strength required. The weft yarns are also constructed of polyester yarns having a denier of about 150. In the preferred embodiment, the fabric is a plain weave having 76±2×56±2 threads per inch. The polyester yarn preferably has a tenacity of greater than about 4 grams/denier. Also, it has been found that the number of filaments per strand of yarn affects the amount of noise produced. Accordingly, in the preferred embodiment, the yarn includes greater than about 34 filaments per strand of yarn with about 48 filaments per strand of yarn.

Figure 3A:
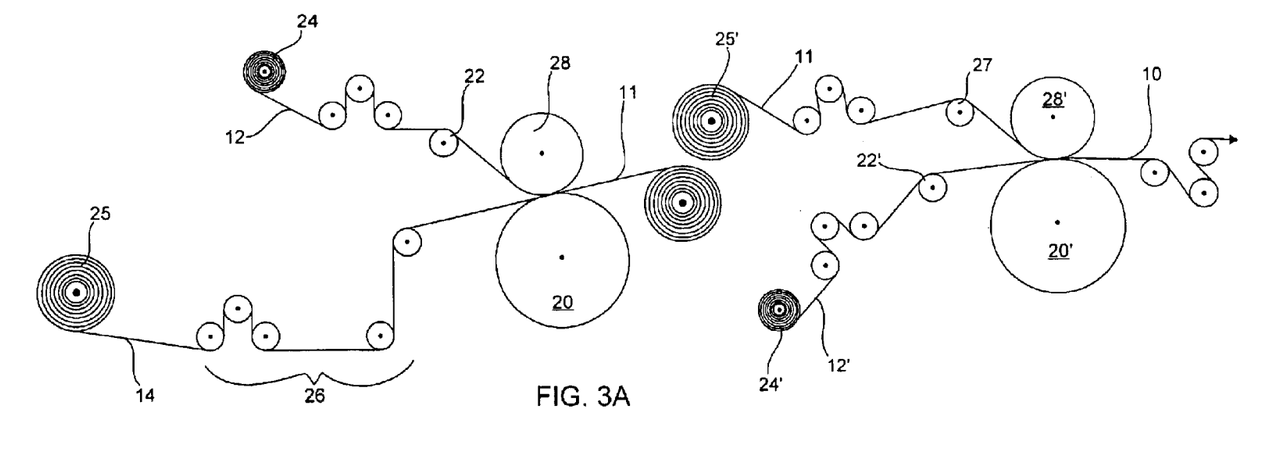
FIG. 3A is a schematic representation of an apparatus for carrying out a first pass for producing a laminated fabric web of the present invention that may be subjected to a pass for producing an alternative laminated fabric web of the present invention.
Figure 3B:
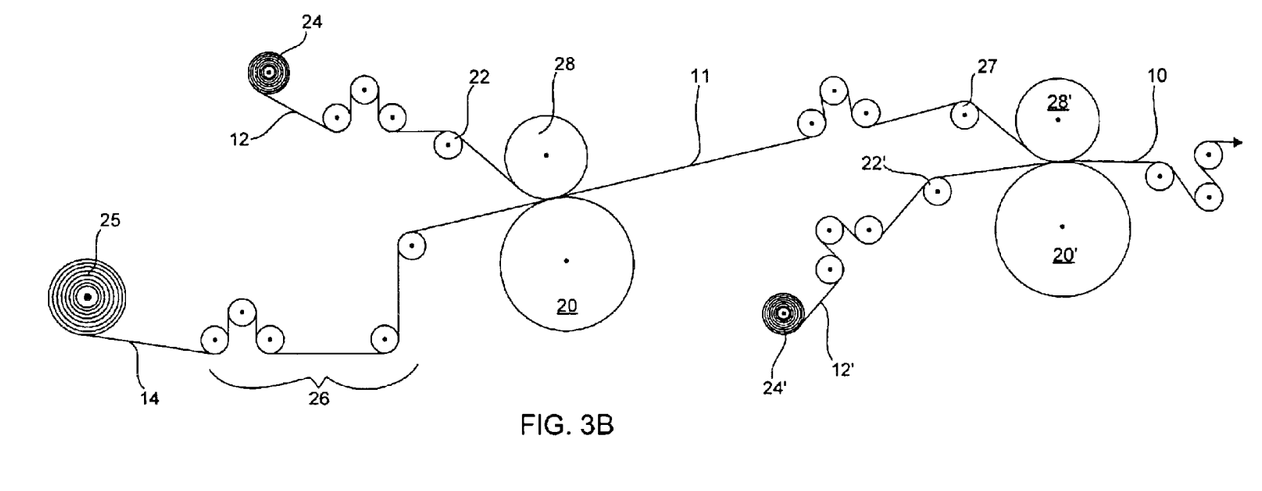
FIG. 3B is a schematic representation of an apparatus for carrying out a single pass for producing a laminated fabric web of the present invention.

Referring to FIGS. 3A and 3B, the laminated fabric 10 was produced on a conventional laminator in the following manner. As seen in FIG. 3A, first, fabric substrate 14 is delivered by a series of rollers to a heated drum 20. The temperature of the heated drum 20 is maintained at or above approximately 400° F. during this process. A series of rollers 26 function to maintain the appropriate tension on fabric substrate 14 as it is being delivered to the drum 20. Fabric substrate 14 is drawn from roll 25 and laid on top of drum 20. Next, a first layer of polyurethane film 12 is delivered by a series of rollers to the top of fabric substrate 14 which is on drum 20. During this passage, the film 12 is prevented from wrinkling by expander roll 22 while the film 12 is laid. The first layer of film 12 is drawn from a roll 24 and laid onto fabric substrate 14 and the two layers pass between drum 20 and rubber nip roll 28 that squeezes with sufficient pressure and heat to form a one-sided laminate 11. As depicted in on the left-hand side of FIG. 3A, the one-sided laminate 11 may be accumulated as roll 25' for use as is or further processing as shown on the right-hand side of FIG. 3A.

In the later case, the resulting roll 25' may be placed on a second line so that the one-sided laminate 11 is delivered over expander roller 27 into the nip between heated drum 20' and nip roller 28'. In this process, laminated fabric 11 may be re-heated to soften the one-sided laminate 11, and then laminated with a second film 12' on the opposite surface of the one-sided laminate fabric substrate 11. As with the heated drum 20, heated drum 20' is maintained at or above approximately 400° F. during this process. A second layer of polyurethane film 12' is delivered over roller 22' and under the bottom of laminate 11 onto the surface of drum 22 where it passes along with laminate 11 between the nip formed by nip roll 28' and drum 20', thus forming two sided laminate 10.

The surface temperature of the heated drums 20 & 20' may vary depending on the specification of the polyurethane film selected. In the embodiment described, the Deerfield Polyurethane PT6211S film had a thickness of about 1 mil. With this construction, acceptable lamination was achieved when the surfaces of the heated drums 20 & 20' reached temperatures ranging between about 380° F. and 420° F.

The second lamination step is preferably done during a single pass on a two stage laminator in combination with the first lamination and a second lamination, as shown in FIG. 3B. The two sided lamination may also be performed in a single overall step. In this process fabric substrate 14 may be simultaneously introduced between nip roll 28 and heated drum 20 with one layer of film 12 above the fabric 14 and one layer of film 12 below the fabric 14.

Figure 4:
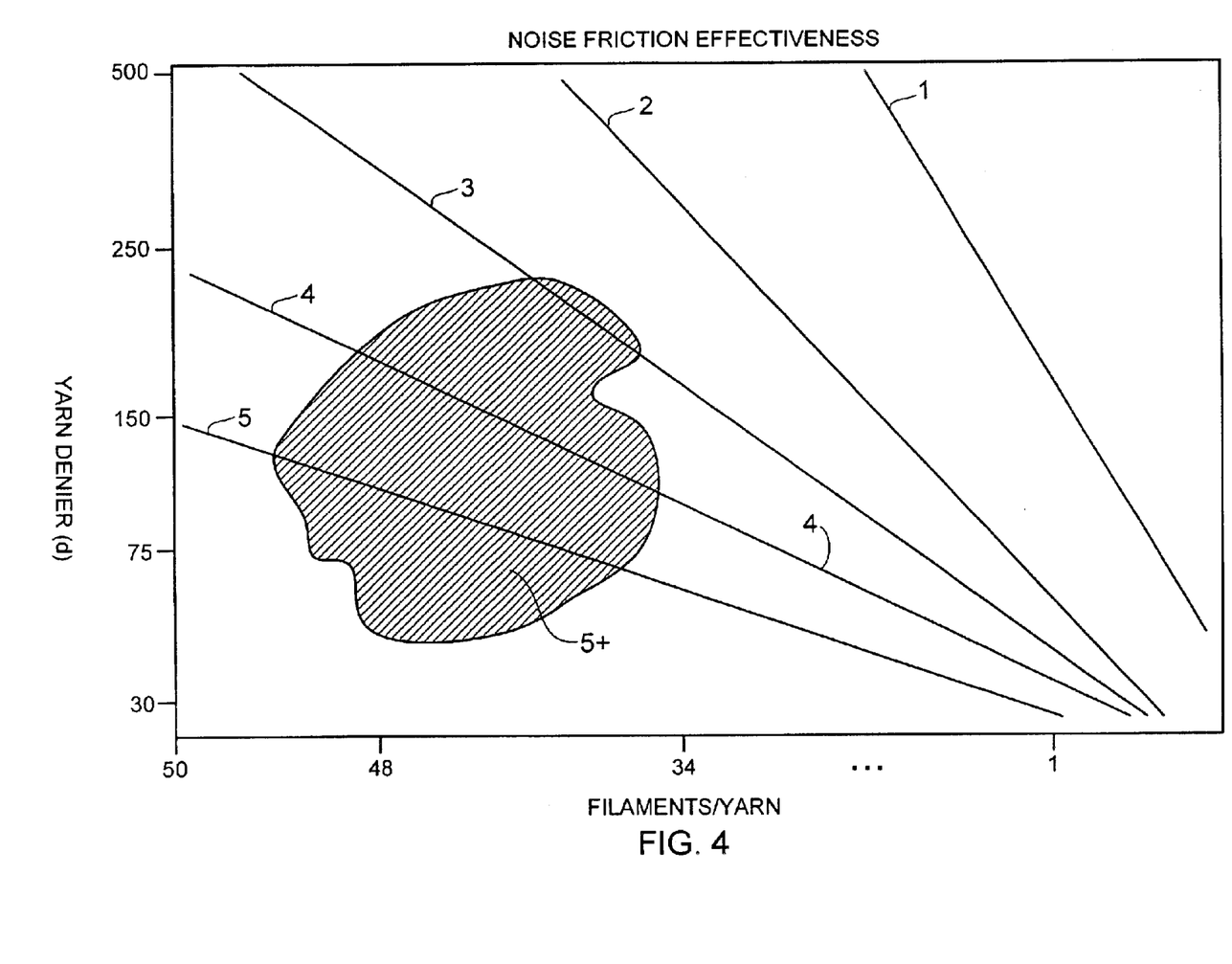
FIG. 4 is a graphical representation of the effect of Yarn Denier and Filament Count on reduction of noise produced by operation of the assembly.

Comparison testing was conducted to analyze the effect of yarn denier and filament count on reduction of noise produced by operation of the cartridge assembly 40. In FIG. 4, noise reduction is represented on a scale from zero to five (i.e., 0=no noise reduction, 1=minimal noise reduction, 2=between minimal and adequate noise reduction, 3=adequate noise reduction, 4=between adequate and superior noise reduction, 5=superior noise reduction, and 5+=exceedingly superior noise reduction). As best seen in FIG. 4, maximum noise reduction is affected both by denier and by filament count. Increasing the filament count from about 34 to 48 increases the flexibility of the resultant yarn and, thus, the resulting fabrics 10. For example, a fabric 10 made using 150 denier yarn having the filament count of about 48 exhibits increased reduction of noise (makes less noise) during the operation of a cartridge assembly 40 relative to another fabric 10 made using 150 denier yarn having the filament count of about 34. Typically, yarn strength decreases with decreasing denier and flexibility increases. A more flexible fabric 10 while exhibiting increased noise reduction (making less noise) also requires less energy to be move within the cartridge assembly 40. As a result, making a fabric 10 using higher filament count yarns allows the fabric strength to be maintained while resulting in a reduction of the noise generated during the operation of the cartridge assembly 40. At the same time, the energy required to move the fabric 10 within cartridge assembly 40 is reduced. The shaded area of FIG. 4 signifies a region bound by yarn denier and filament counts (filaments/yarn) that applicants believe provides adequate noise reduction to exceedingly superior noise reduction and adequate energy reduction to exceedingly superior energy reduction. Typically, yarn tenacity decreases with decreasing denier while, at the same time, yarn cost increases. Therefore, using higher filament count yarns not only increases the effectiveness of noise reduction but also increases strength and reduces the energy required to move the fabric 10.

Figure 5:
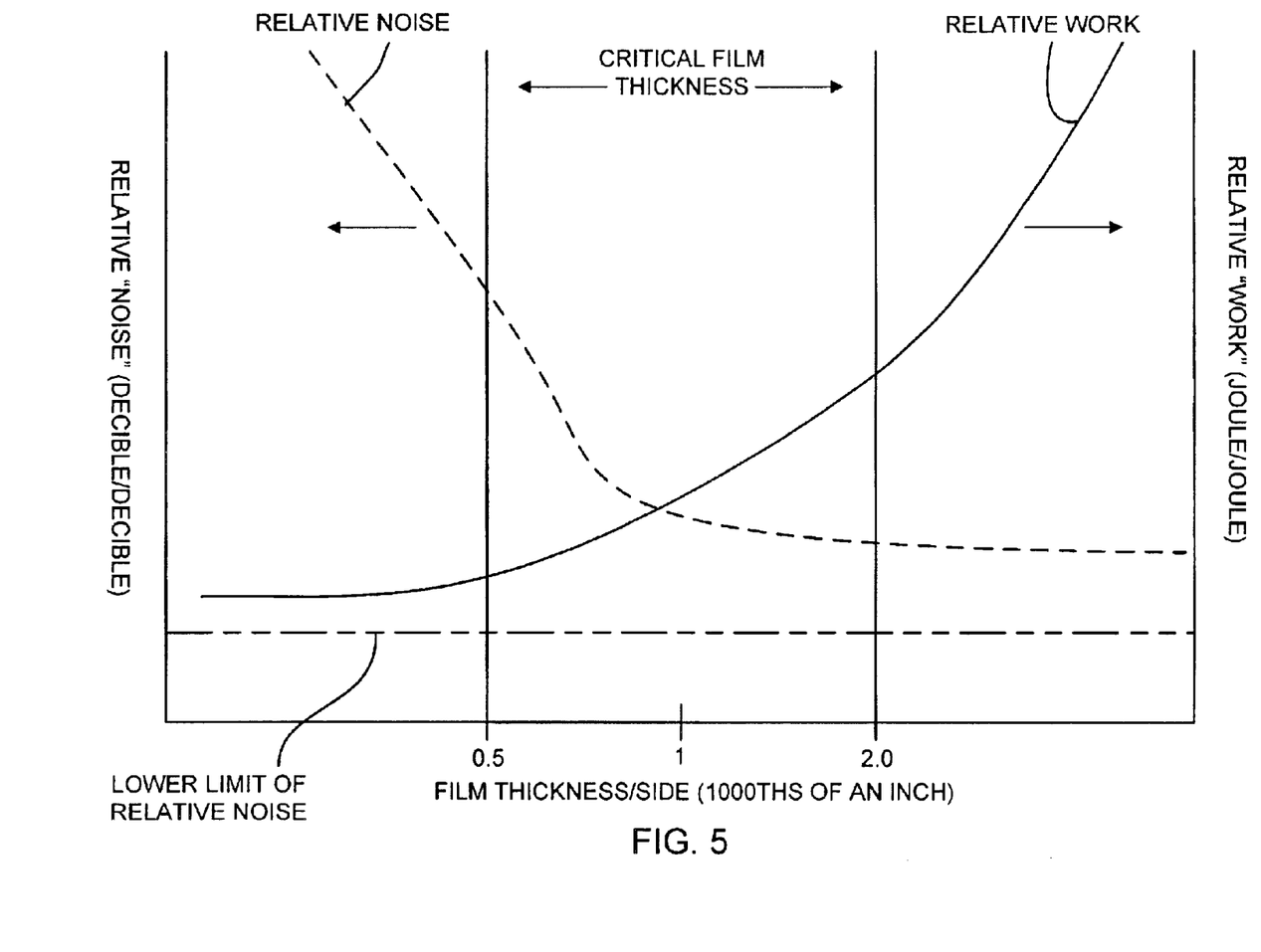
FIG. 5 is a graphical representation of the effect of Film Thickness on (1) Noise and (2) Work required to move the laminated fabric by operation of the assembly.

FIG. 5 shows an analysis of the effect of film thickness on (1) relative noise (left-hand y axis), and (2) relative work required to move the laminated fabric by operation of the assembly (right-hand y axis). As seen in FIG. 5, noise decreases as film thickness increases until it reaches a lower limit below which increasing film thickness does not further reduce noise. On the other hand, relative work increases as the film thickness continues to increase as the film thickness is increased. As can be seen, a film thickness between about 0.5 and 2 mils, with 1 mil preferred, balances the competing interests of relative noise reduction and relative work increase of the fabric 10.

Figure 6:
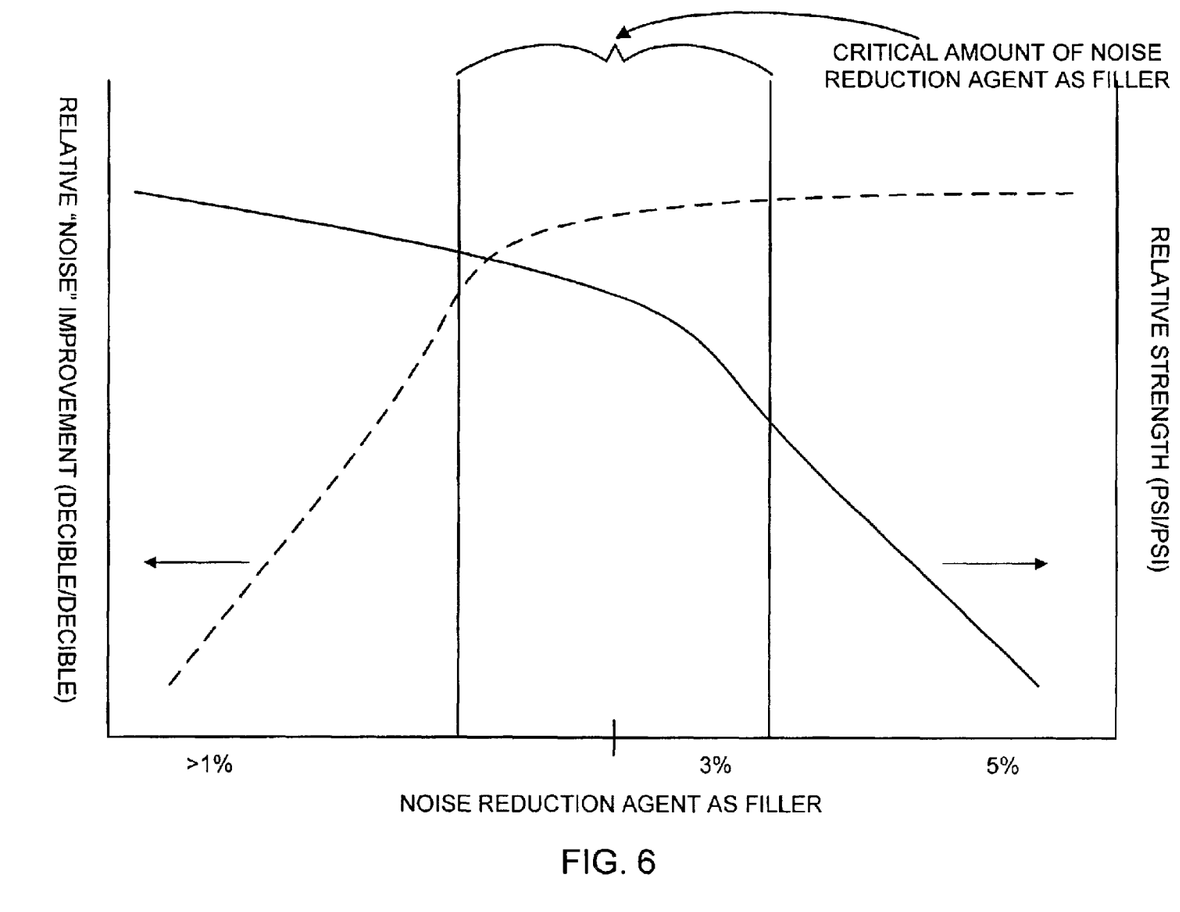
FIG. 6 is a graphical representation of the effect of Noise Reduction Filler on (1) Noise and (2) Strength of the assembly.

Finally, FIG. 6 shows an analysis of the effect of noise/friction reduction agent in the material used to make the cartridge assembly on (1) Noise, and (2) Work required to move the laminate and (3) Strength of the assembly. As best seen in FIG. 6, relative work required decreases as the amount of noise/friction reduction agent increases until it reached an upper limit above which increasing the amount of noise reduction agent does not further reduce noise or work. On the other hand, strength decreases slowly as the amount of noise/friction reduction agent is increased until a critical point is reached, after which strength decreases quickly. As can be seen a noise/friction reduction agent amount between about 1 and 5 wt. %, with 3 wt. % preferred, balances the competing interests of noise and work reduction and strength of the cartridge assembly.

Additional analysis may be done on the effect of a low friction finish, for example, as a topicality on the fabric 10, on (1) relative work required to move the fabric, (2) on relative noise generated during movement, and (3) on the interaction between layers of the laminated fabric itself. Examples of the low friction finish may include any one of higher aliphatic acid amides, higher aliphatic acid esters, waxes, metal soaps, silicones, fluoropolymers, higher aliphatic acid esters and combination thereof. Preferably, the low friction finish may be selected from the group consisting of silicones, fluoropolymers, and higher aliphatic acid esters. One particularly preferred low friction finish is a fluoropolymers, such as, for example, polytetrafluoroethylene (PTFE), while another is a silicone oil, such as for example polydimethylsiloxane.

Applicants are aware that PTFE materials milled to very fine size (from between about 0.25 and 0.28 $\mu$m) retain the excellent lubricating properties of PTFE when includes in a base material. Milled PTFE materials are commercially available as powders that may then be compounded in polymer. Also, milled PTFE materials are commercially available as powder dispersed in liquids. Such PTFE materials are commercially available under the trademark Fluon® from Asahi Glass Fluoropolymers USA, Inc. Some example of these products include Fluon® AD1, AD1H, AD1L, AD1LN, AD1S, AD145, AD2, AD133, AD1030, and AD1006 aqueous dispersion (AD) resins. Other such PTFE materials are commercially available under the trademarks Teflon® and Tefzel® from du Pont de Nemours and Company. Some example of these products include Teflon® PTFE Grade 30, 30B, 304A, 305A, 307A, 313A, B, 35, FPD 3584, and K-20 aqueous dispersion resins. Yet other such PTFE materials are commercially available under the trademarks NANOFLON™ and Fluoro™ from Shamrock Technologies, Inc. Some example of these products include NANOFLON™ PTFE M020, PTFE PIB25, PTFE PA030, and PTFE AQ50SM, and X-TREME™ dispersion resins and Fluoro™ M290 PTFE, E PTFE, HP PTFE and FG PTFE micronized powders. Such dispersion resins can provide the benefits of PTFE to substrates through impregnating or coating. The benefits may include thermal stability to at least 500° F., extreme chemical inertness, low coefficient of friction, and excellent 'nonstick' properties. The products may consist of small negatively charged particles of PTFE, ranging from 0.25–0.28 $\mu$m in mean diameter depending on the grade. The dispersion may contain additional surfactants for stability and wetting properties.

Figure 7:
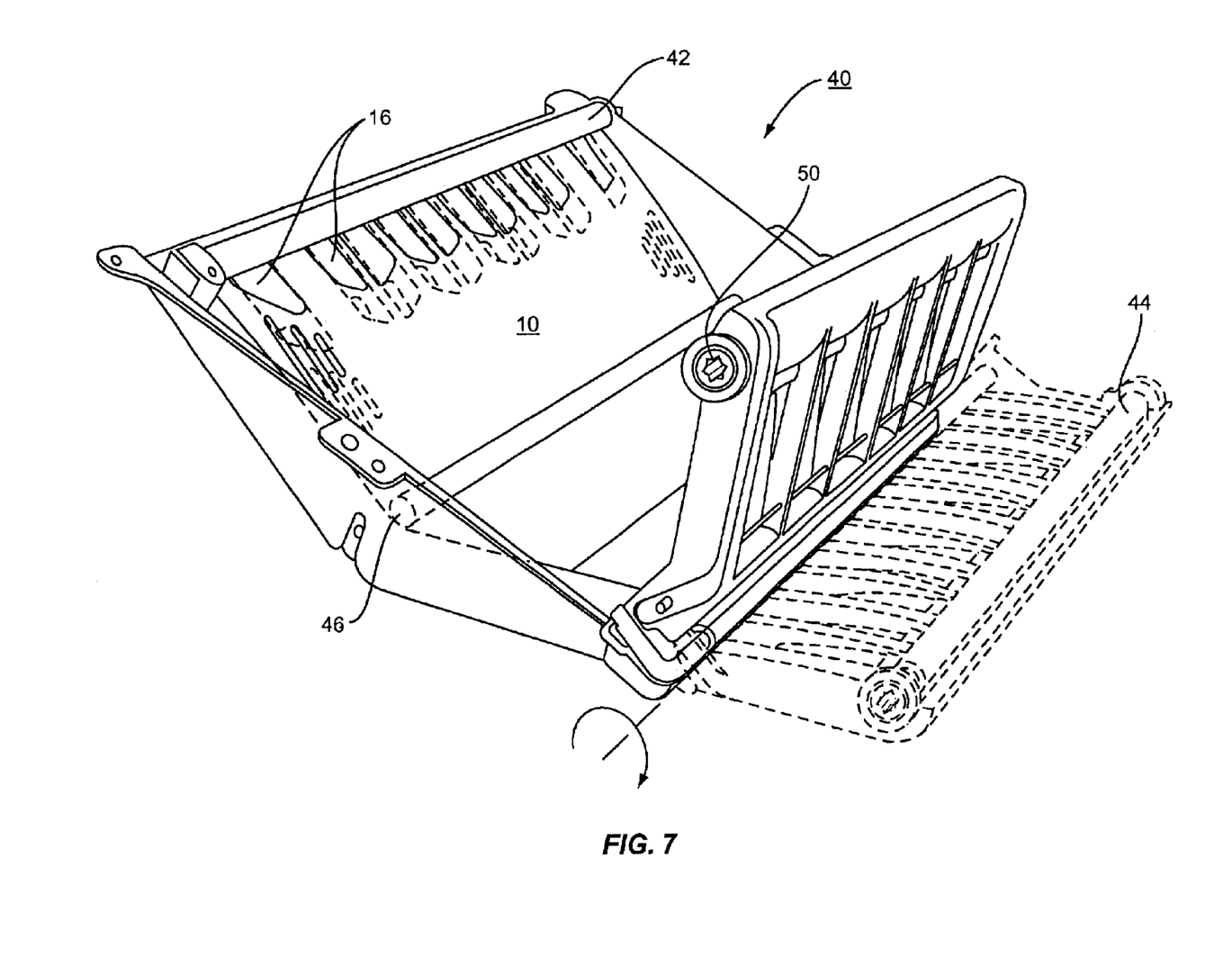
FIG. 7 is a perspective view of a fabric cartridge for an automotive heating and cooling system constructed according to the present invention.

As best seen in FIG. 7, after either the a one-sided laminate 11, or if further processing in desire, two sided laminate 10. is formed, it is die cut in a conventional manner and assembled into fabric cartridge 40 for an automotive heating and cooling system.

The cartridge assembly housing 40 may be formed using a polyolefin such as a polypropylene. A filler may be integrally formed within the cartridge assembly housing. Such a filler reduces a polymer content of the cartridge assembly housing. Also, such filler can reduce the cost of the cartridge assembly housing 40 while at the same time increasing the strength. Applicants believe that appropriate fillers, besides reducing cost and strengthen the cartridge assembly housing, should be of such a size and distribution so as not to interfere with the quiet operation of the fabric cartridge. The filler may be between about 1 and 40 wt. % of the cartridge assembly housing. Some examples of the filler that may be appropriate include any one of natural silica (diatomaceous earth), silicon dioxide ($SiO_2$)-mined, talc, magnesium silicate-mined, synthetic silica, silicon dioxide-manufactured, calcium carbonate, calcium carbonate ($CaCO_3$)-mined, ceramic spheres, alumina-silicate ceramic-manufactured, kaolin clay, aluminum silicate-mined, mica, aluminum potassium silicate-mined, calcium phosphate and combinations thereof Applicants have found that talc performs well as the filler. Talc is also known as agalite, fibrous non-tremolite talc, french chalk, hydrous magnesium silicate, magnesium silicate talc, mineral graphite, non-asbestiform talc, non-fibrous talc, silica (talc, non-asbestos form), snowgoose, soapstone, steatite, steatite talc, talc (containing no asbestos); talc (containing no asbestos fibres), talc ($Mg_3H_2(SiO_3)_4$), talc, non-asbestos form; talc (non-asbestos form) silica, talc U.S.P, and talcum. Talc is a hydrous silicate mineral composed of magnesium (Mg), silicon and oxygen ($SiO_2$, silica), and water. One chemical formula is $Mg_3Si_4O_{10}(OH)_2$.

The noise/friction reduction agent for reducing the interaction between the housing and the fabric web may be integrally formed within the cartridge assembly housing. The reduction agent may be any one of a antiblock additive, slip additive, and antiblock additive and slip additive. Such antiblock and slip additives are used in the polymer film art. The reduction agent may be selected from the group consisting of higher aliphatic acid amides, higher aliphatic acid esters, waxes, metal soaps, silicones, fluoropolymers, and fatty acids. Applicant believe that a preferred reduction agent is a silicone oil. Useful silicone oils are sold by Dow Corning Corporation of Midland, Mich. The noise/friction reduction agent may be between about 1 and 5 wt. % of the cartridge assembly housing .

In the preferred embodiment, the cartridge assembly 40 includes a supply roll 42 and a take-up roll 44. The cartridge assembly 40 may further include at least one guide roller 46 and a female hex sprocket 50 for engaging a drive motor, normally not part of the assembly 40. Also, in the preferred embodiment, at least one of the supply roll 42 and take-up roll 44 is tensioned. In the most preferred embodiment, the supply roll 42 and the take-up roll are 44 counter-tensioned with respect to one another. This further reduces the size of the motor necessary to move the film 10 in the assembly 40.

Certain modifications and improvements will occur to those skilled in the art upon a reading of the foregoing description. It should be understood that all such modifications and improvements have been deleted herein for the sake of conciseness and readability but are properly within the scope of the following claims.

We claim:

1. A fabric web for a fabric cartridge for an automotive heating and cooling system, said fabric web comprising:
    (a) a float-free fabric substrate;
    (b) at least one surface including a laminated film;
    (c) an interface coating including a polyurethane solution between said fabric substrate and said laminated film; and
    (d) a plurality of apertures for diverting airflow in said heating and cooling system.

2. The apparatus according to claim 1, wherein said fabric substrate is a plain weave.

3. The apparatus according to claim 1, wherein said fabric substrate is formed from polyester yarn.

4. The apparatus according to claim 3, wherein said polyester yarn has a tenacity of greater than about 4 grams/denier.

5. The apparatus according to claim 1, wherein the warp yarn of said fabric substrate is between about 70 and 250 denier.

6. The apparatus according to claim 5, wherein the warp yarn of said fabric substrate is about 150 denier.

7. The apparatus according to claim 5, wherein the fill yarn of said fabric substrate is between about 70 and 250 denier.

8. The apparatus according to claim 5, wherein the fill yarn of said fabric substrate is about 150 denier.

9. The apparatus according to claim 5, wherein said yarn includes greater than about 34 filaments per strand of yarn.

10. The apparatus according to claim 9, wherein said yarn includes about 48 filaments per strand of yarn.

11. The apparatus according to claim 1, wherein the thickness of said laminated film is between about 0.5 and 2 mils.

12. The apparatus according to claim 11, wherein the thickness of said laminated film is about 1 mil.

13. The apparatus according to claim 1, wherein said laminated film further includes an antiblock agent.

14. The apparatus according to claim 13, wherein said film antiblock additive is a filler.

15. The apparatus according to claim 14, wherein said film antiblock additive filler is between about 0.1 and 5 wt. % of said laminated film.

16. The apparatus according to claim 14, wherein said film antiblock additive filler is an inorganic filler selected from the group consisting of natural silica (diatomaceous earth), silicon dioxide ($SiO_2$)-mined, talc, magnesium silicate-mined, synthetic silica, silicon dioxide-manufactured, calcium carbonate, calcium carbonate ($CaCO_3$)-mined, ceramic spheres, alumina-silicate ceramic-manufactured, kaolin clay, aluminum silicate-mined, mica, aluminum potassium silicate-mined, and calcium phosphate.

17. The apparatus according to claim 16, wherein said inorganic filler is natural silica (diatomaceous earth).

18. The apparatus according to claim 1, wherein said laminated film further includes a film slip additive.

19. The apparatus according to claim 18, wherein said film slip additive is a filler.

20. The apparatus according to claim 19, wherein said film slip additive filler is between about 1 and 5 wt. % of said laminated film.

21. The apparatus according to claim 18, wherein said film slip additive is a topicality.

22. The apparatus according to claim 21, wherein said film slip additive topicality is between about 1 and 3 wt. % of said laminated film.

23. The apparatus according to claim 18, wherein said film slip additive is selected from the group consisting higher aliphatic acid amides, higher aliphatic acid esters, waxes, metal soaps, silicones, fluoropolymers, and higher aliphatic acid esters.

24. The apparatus according to claim 23, wherein said film slip additive is selected from the group consisting of silicones, fluoropolymers, and higher aliphatic acid esters.

25. The apparatus according to claim 24, wherein said film slip additive is selected from the group consisting of bis-amide ethylene, bisstearamide (ebs), secondary amide, stearyl erucamide, primary amide, stearamide, erucamide, organic stearate, glycerol monostearate (gms), metallic stearate, and zinc stearate.

26. The apparatus according to claim 24, wherein said film slip additive is a silicone oil.

27. The apparatus according to claim 1, wherein said laminated film is a polyurethane film.

28. The apparatus according to claim 27, wherein said polyurethane film is a thermoplastic polyurethane film.

29. The apparatus according to claim 28, wherein said polyurethane film is a an aromatic thermoplastic polyurethane film.

30. The apparatus according to claim 28, wherein said polyurethane film is a an aromatic ether thermoplastic polyurethane film.

31. The apparatus according to claim 1, wherein said interface coating further includes an adhesion promoter including isocyaninate and azaridine.

32. The apparatus according to claim 31, wherein said interface coating further includes a flame retardant.

33. The apparatus according to claim 32, wherein said flame retardant includes a chemistry based on any one of alumina trihydrate, antimony oxide, bromine, chlorine, magnesium hydroxide, phosphorus and combinations thereof.

34. The apparatus according to claim 33, wherein said flame retardant includes a phosphorus-based chemistry selected from any one of cyclic phosphates, phosphites, and phosphate esters.

35. The apparatus according to claim 1, wherein the opposite surface of said fabric includes a second laminated film.

36. The apparatus according to claim 35, wherein said second laminated film is substantially similar to said first laminated film.

37. A fabric cartridge for an automotive heating and cooling system, said apparatus comprising:
   (a) a cartridge assembly, said cartridge assembly including a housing;
   (b) a single-ply, die cut fabric web disposed therein, said fabric web including: (i) a float-free fabric substrate; (ii) at least one surface including a laminated film; (iii) an interface coating including a polyurethane solution between said fabric substrate and said laminated film; and (iv) a plurality of apertures for diverting airflow in said heating and cooling system; and
   (c) a noise/friction reduction agent for reducing the interaction between said housing and said fabric web.

38. The apparatus according to claim 37, wherein said reduction agent is integrally formed within the cartridge assembly housing.

39. The apparatus according to claim 37, further including a filler integrally formed within the cartridge assembly housing.

40. The apparatus according to claim 39, wherein said filler is selected from the group consisting of natural silica (diatomaceous earth), silicon dioxide ($SiO_2$)-mined, talc, magnesium silicate-mined, synthetic silica, silicon dioxide-manufactured, calcium carbonate, calcium carbonate ($CaCO_3$)-mined, ceramic spheres, alumina-silicate ceramic-manufactured, kaolin clay, aluminum silicate-mined, mica, aluminum potassium silicate-mined, and calcium phosphates.

41. The apparatus according to claim 40, wherein said filler is talc.

42. The apparatus according to claim 40, wherein said filler is between about 1 and 40 wt. %.

43. The apparatus according to claim 37, wherein said reduction agent is one of a antiblock additive, slip additive, and antiblock additive and slip additive.

44. The apparatus according to claim 42, wherein said reduction agent is selected from the group consisting of higher aliphatic acid amides, higher aliphatic acid esters, waxes, metal soaps, silicones, fluoropolymers, and fatty acids.

45. The apparatus according to claim 44, wherein said reduction agent is a silicone oil.

46. The apparatus according to claim 37, wherein said reduction agent is between about 1 and 5 wt. % of the cartridge assembly housing.

47. The apparatus according to claim 37, wherein said fabric web includes a low friction finish.

48. The apparatus according to claim 46, wherein said low friction finish is selected from the group consisting of higher aliphatic acid amides, higher aliphatic acid esters, waxes, metal soaps, silicones, fluoropolymers, and higher aliphatic acid esters.

49. The apparatus according to claim 48, wherein said low friction finish is selected from the group consisting of silicones, fluoropolymers, and higher aliphatic acid esters.

50. The apparatus according to claim 48, wherein said low friction finish is a polytetrafluoroethylene.

51. The apparatus according to claim 48, wherein said low friction finish is a silicone oil.

52. The apparatus according to claim 37, wherein said cartridge assembly includes a supply roll and a take-up roll.

53. The apparatus according to claim 52, wherein said cartridge assembly further includes at least one guide roller.

54. The apparatus according to claim 52, wherein said cartridge assembly further includes means for engaging a drive motor.

55. The apparatus according to claim 54, wherein said means for engaging said drive motor is a female hex sprocket.

56. The apparatus according to claim 52, wherein at least one of said supply roll and take-up roll is tensioned.

57. The apparatus according to claim 56, wherein said supply roll and said take-up roll are counter-tensioned with respect to one another.

58. The apparatus according to claim 37, wherein said fabric substrate is a plain weave.

59. The apparatus according to claim 37, wherein said fabric substrate is formed from polyester yarn.

60. The apparatus according to claim 59, wherein said polyester yarn has a tenacity of greater than about 4 grams/denier.

61. The apparatus according to claim 37, wherein the warp yarn of said fabric substrate is between about 70 and 250 denier.

62. The apparatus according to claim 61, wherein the warp yarn of said fabric substrate is about 150 denier.

63. The apparatus according to claim 61, wherein the fill yarn of said fabric substrate is between about 70 and 250 denier.

64. The apparatus according to claim 61, wherein the fill yarn of said fabric substrate is about 150 denier.

65. The apparatus according to claim 61, wherein said yarn includes greater than about 34 filaments per strand of yarn.

66. The apparatus according to claim 65, wherein said yarn includes about 48 filaments per stand of yarn.

67. The apparatus according to claim 37, wherein the thickness of said laminated film is between about 0.5 and 2 mils.

68. The apparatus according to claim 67, wherein the thickness of said laminated film is about 1 mil.

69. The apparatus according to claim 37, wherein said laminated film further includes an antiblock agent.

70. The apparatus according to claim 69, wherein said film antiblock additive is a filler.

71. The apparatus according to claim 70, wherein said film antiblock additive filler is between about 0.1 and 5 wt. % of said laminated film.

72. The apparatus according to claim 70, wherein said film antiblock additive filler is an inorganic filler selected from the group consisting of natural silica (diatomaceous earth), silicon dioxide ($SiO_2$)-mined, talc, magnesium silicate-mined, synthetic silica, silicon dioxide-manufactured, calcium carbonate, calcium carbonate ($CaCO_3$)-mined, ceramic spheres, alumina-silicate ceramic-manufactured, kaolin clay, aluminum silicate-mined, mica, aluminum potassium silicate-mined, and calcium phosphate.

73. The apparatus according to claim 70, wherein said an inorganic filler is natural silica (diatomaceous earth)talc.

74. The apparatus according to claim 37, wherein said laminated film further includes a film slip additive.

75. The apparatus according to claim 74, wherein said film slip additive is a filler.

76. The apparatus according to claim 75, wherein said film slip additive filler is between about 1 and 5 wt. % of said laminated film.

77. The apparatus according to claim 74, wherein said film slip additive is a topicality.

78. The apparatus according to claim 77, wherein said film slip additive topicality is between about 1 and 3 wt. % of said laminated film.

79. The apparatus according to claim 74, wherein said film slip additive is selected from the group consisting higher aliphatic acid amides, higher aliphatic acid esters, waxes, metal soaps, silicones, fluoropolymers, and higher aliphatic acid esters.

80. The apparatus according to claim 79, wherein said film slip additive is selected from the group consisting of silicones, fluoropolymers, and higher aliphatic acid esters.

81. The apparatus according to claim 80, wherein said film slip additive is selected from the group consisting of bis-amide ethylene, bisstearamide (ebs), secondary amide, stearyl erucamide, primary amide, stearamide, erucamide, organic stearate, glycerol monostearate (gms), metallic stearate, and zinc stearate.

82. The apparatus according to claim 80, wherein said film slip additive is a silicone oil.

83. The apparatus according to claim 37, wherein said laminated film is a polyurethane film.

84. The apparatus according to claim 83, wherein said polyurethane film is a thermoplastic polyurethane film.

85. The apparatus according to claim 84, wherein said polyurethane film is a an aromatic thermoplastic polyurethane film.

86. The apparatus according to claim 84, wherein said polyurethane film is a an aromatic ether thermoplastic polyurethane film.

87. The apparatus according to claim 37, wherein said interface coating further includes an adhesion promoter including isocyaninate and azaridine.

88. The apparatus according to claim 87, wherein said interface coating further includes a flame retardant.

89. The apparatus according to claim 88, wherein said flame retardant includes a chemistry based on any one of alumina trihydrate, antimony oxide, bromine, chlorine, magnesium hydroxide, phosphorus and combinations thereof.

90. The apparatus according to claim 89, wherein said flame retardant includes a phosphorus-based chemistry selected from any one of cyclic phosphates, phosphites, and phosphate esters.

91. The apparatus according to claim 37, wherein the opposite surface of said fabric includes a second laminated film.

92. The apparatus according to claim 91, wherein said second laminated film is substantially similar to said first laminated film.

\* \* \* \* \*

UNITED STATES PATENT AND TRADEMARK OFFICE
CERTIFICATE OF CORRECTION

PATENT NO. : 6,905,985 B1
DATED : June 14, 2005
INVENTOR(S) : Fortenbery et al.

It is certified that error appears in the above-identified patent and that said Letters Patent is hereby corrected as shown below:

Column 3,
Line 16, there should be a period after the word "thereof".

Column 9,
Line 53, there should be a period after the word "thereof".

Signed and Sealed this

Sixteenth Day of August, 2005

JON W. DUDAS
*Director of the United States Patent and Trademark Office*